Nov. 29, 1960  A. R. MOLZAN ET AL  2,962,245
ATTACHMENT FITTING
Filed Nov. 3, 1958  2 Sheets-Sheet 1
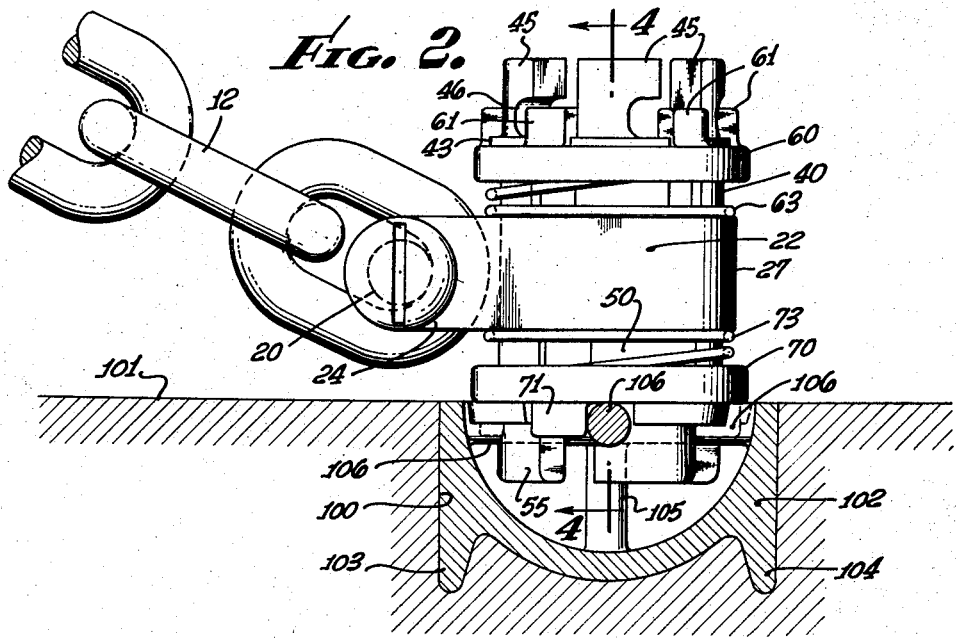
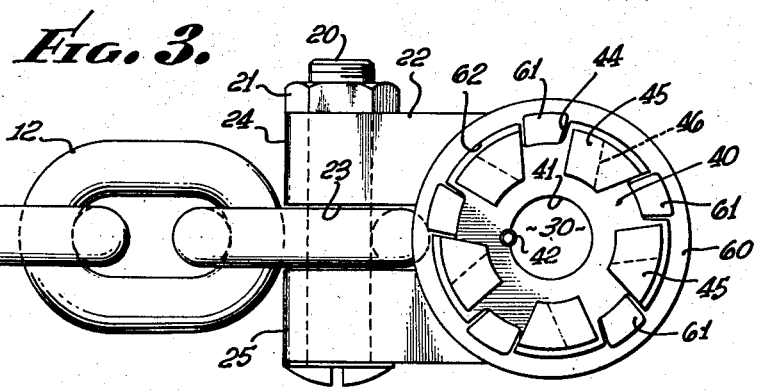
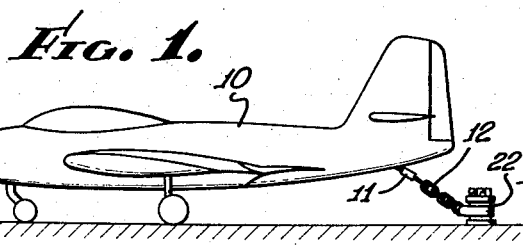
ALBERT R. MOLZAN
ROBERT L. BROWN
INVENTORS
BY Huebner & Worrel
ATTORNEYS.

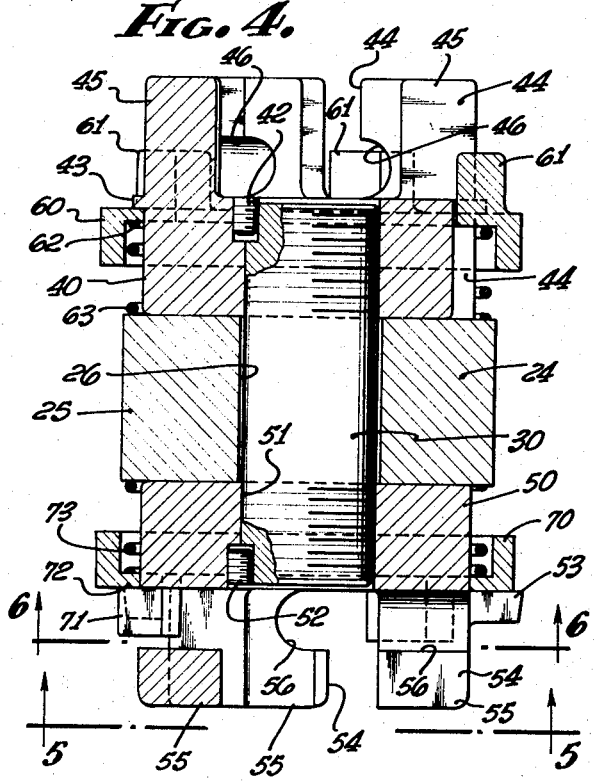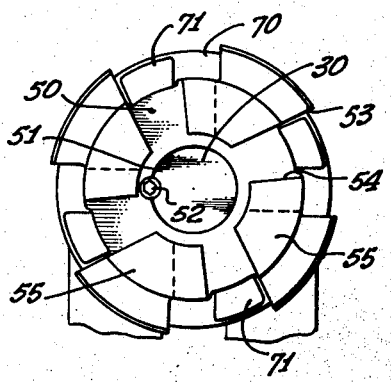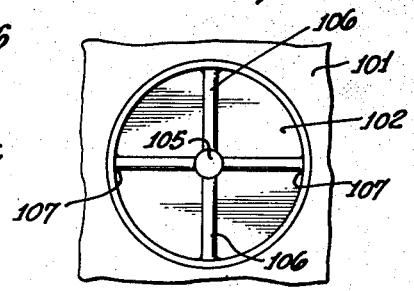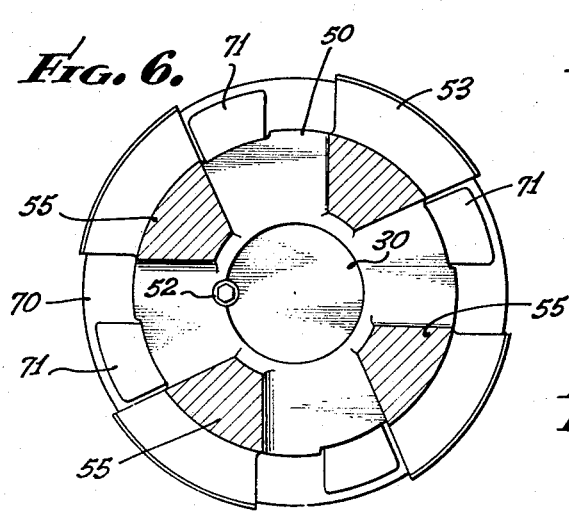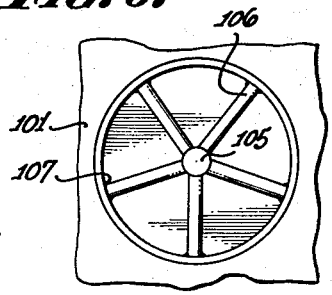

United States Patent Office 2,962,245
Patented Nov. 29, 1960

2,962,245

ATTACHMENT FITTING

Albert R. Molzan, Pasadena, and Robert L. Brown, Altadena, Calif., assignors to Aeroquip Corporation, Jackson, Mich., a corporation of Michigan Filed Nov. 3, 1958, Ser. No. 771,277

11 Claims. (Cl. 244—115)

This invention relates to an attachment fitting for fastening a line, cable or chain to fixed anchor means. It is particularly adaptable for anchoring chains which are subject to excessive pull tensions, such as chains used to anchor aircraft to a landing strip or carrier deck during full power run-up, when tensions in excess of 70,000 pounds are often present, but the invention may also be used wherever firm anchoring of lines, cables or chains to a fixed object is desired.

When full power run-up of an aircraft is required, a length of line, cable or chain is generally secured at one end to the rear section of the fuselage of the aircraft, and at the other end to a fixed anchor means. When full power is applied to the aircraft engines, tremendous pull tension is applied to the line, cable or chain and the anchor means, and, because of the angular position of the line, cable or chain from the fixed anchor means on the ground or deck, distortion, warping and shearing of the attachment fitting used to secure the line, cable or chain to the anchor means often results.

Furthermore, it is frequently desired to provide an attachment for such use which can be quickly and easily released from the anchor means on the ground or deck, without sacrificing strength and durability in the attachment.

An object of the present invention is to provide a strong attachment fitting which will securely attach a line, cable or chain to a fixed anchor means.

A further object of the invention is to provide a fitting which will withstand excessive tension without distortion, warping or snapping.

Another object of the invention is to provide such a fitting which may be quickly and easily mounted and detached.

A further object of the invention is to provide a fitting which is adjustable to various angles of attachment of a line, cable or chain.

Another object of the invention is to provide a fitting which may be adapted to be attached to more than one form of anchor means.

The invention also comprises novel details of construction and novel combinations and arrangements which will be apparent from the following description and drawings which, however, merely describe preferred embodiments of the present invention, and which are given for purposes of illustration and example only.

In the drawings:

Figure 1 is a side view of an airplane anchored to a platform, deck or runway.

Figure 2 is an enlarged side elevation, partly in section, of the attachment fitting mounted on an anchor.

Figure 3 is a plan view of the attachment fitting shown in Figure 2.

Figure 4 is a substantially enlarged vertical cross-section of the attachment fitting taken on the line 4—4 of Figure 2, but without the anchor.

Figure 5 is a bottom view taken on the line 5—5 of Figure 4.

Figure 6 is a horizontal cross-section of the attachment fitting taken on the line 6—6 of Figure 4.

Figure 7 is a plan view of a four-runged anchor in general use on aircraft carrier decks.

Figure 8 is a plan view of a five-runged anchor also in general use on aircraft carrier decks.

Figure 9 is a side elevation, partly in section, of the fitting releasably attaching the chain of the device to the standard catapult holdback fitting of an aircraft.

Figure 10 is a cross-section on line 10—10 of Figure 9.

An aircraft 10 has a standard catapult holdback fitting 11 mounted on the underside of the fuselage near the tail assembly. Releasably mounted on the standard catapult holdback fitting 11 in the manner hereinafter described in a length of chain 12.

The other end of the length of chain 12 is attached by means of a threaded pin or bolt 20 and a nut 21 to a clevis-type sleeve 22, and end of the chain 12 being disposed in a slot 23 in said sleeve and straddled by the arms 24 and 25 of said sleeve 22. Sleeve 22 has a vertical opening 26 drilled in the body thereof. For convenience and appearance, although not a matter of necessity, the end of sleeve 22 opposite the slot 23 is rounded, as at 27, to conform to the over-all profile of the device.

A stud 30 is loosely disposed in vertical opening 26, permitting sleeve 22 to freely rotate 360° around the stud 30.

Rigidly mounted to the stud 30, at one end thereof, is a body structure 40. A preferred form of rigidly mounting the stud 30 to the body section 40 is by tightly disposing the stud 30 in an opening 41 in the body structure 40, and also securing the stud 30 in said opening 41 by means of a wedge or roll pin 42 disposed between said stud 30 and the opening 41.

A second body structure 50 is similarly rigidly mounted to the opposite end of stud 30, said stud 30 being tightly disposed in an opening 51 in the body structure 50, and secured therein by wedge or roll pin 52.

The lower end of the body structure 40 and the upper end on the second body structure 50 form a deep groove in which the sleeve 22 is freely disposed for rotation, but which arrests substantial lateral movement of sleeve 22 on said stud 30.

An outwardly extending flange 43 is formed at the upper end of the body structure 40. Flange 43 forms a seat for the collar 60 hereinafter described. Similarly an outwardly extending flange 53 is formed at the lower end of body structure 50 to form a seat for collar 70 hereinafter described.

Five parallel vertical grooves 44 are cut in the upper end of the body structure 40 and extend through the flange 43, and four parallel grooves 54 are cut in the upper end of the body structure 50 and extend through the flange 53.

Formed on the body structure 40 and projecting upwardly therefrom are five engaging dogs 45, disposed between the grooves 44 and each arranged to accommodate one of the five spokes of one of the anchor members hereinafter mentioned. Each of said dogs 45 has an arcuate indentation 46 in one side thereof in which one of said spokes is disposed in the manner hereinafter described. Similarly formed on the body structure 50 and projecting downwardly therefrom are four engaging dogs 55, disposed between grooves 53 and each arranged to accommodate one of the four spokes of the other anchor member hereinafter mentioned, each of said dogs 55 having an arcuate indentation 56 in one side thereof in which one of said spokes is disposed in the manner hereinafter described.

A ring collar 60 is slidably mounted on the outside of the body structure 40 below the flange 43 and above the sleeve 22. Formed on the collar 60 are five locking dogs 61 which project upwardly from the collar 60. Each of said dogs 61 extends inwardly beyond the inside surface of collar 60, and each of them is disposed in one of the grooves 44 and adapted to slide freely therein.

A step 62 is cut into the underside of collar 60 at its inside surface and forms a seat for a spiral spring 63, mounted on the outside of the body structure 40. The spring 63 is also seated on the sleeve 22, and is positioned to impel collar 60 upwardly.

Similarly, a ring collar 70 is slidably mounted on the outside of the body structure 50 above the flange 53 and below the sleeve 22, and formed on said collar 70 are four locking dogs 71 which project downwardly from the collar 70. Each of said dogs 71 extends inwardly beyond the inside surface of collar 70, and each of them is disposed in one of the grooves 54 and adapted to slide freely therein.

A step 72 is cut into the upper side of collar 70 and forms a seat for a spiral spring 73, mounted on the outside of the body structure 50. The spring 73 is also seated on the sleeve 22, and is positioned to impel collar 70 downwardly.

The standard catapult holdback fitting 11 has a slotted opening 11a and a hole 11b drilled through the sides of said slotted opening 11a and designed to accommodate a pin or bolt 11c. Swivelly disposed in said slotted opening 11a, by one end thereof, and projecting from said slotted opening 11a, is a bar fitting 11d. Cut into the free end of said bar fitting 11d is a slotted opening 11e leading to a wider chamber opening 11f.

A coupling 79 for attachment to said catapult holdback fitting 11 has a heavy threaded bolt 80, having a shaft 81, a head 82 and nuts 83 and 84 mounted thereon. Coupling 79 is adapted to have the shaft 81 thereof disposed in the slotted opening 11e, and the head 82 thereof disposed in the chamber opening 11f. The free threaded end 85 of the bolt 80 is disposed in a threaded opening (not shown) in a clevis-type fitting 86. A slot 87 is cut in the free end of the fitting 86, and the sides of said slot 87 are drilled to form an opening 88 in which a threaded bolt, pin or stud 89, secured in said opening 88 by a nut 90, is disposed. The chain 12 is disposed in said slot 87, being secured therein by bolt 89.

A dimpled opening 100 is formed in the deck 101 of a carrier or the surface of a runway. Tightly disposed in said opening 100 is a cup-shaped fitting 102, which may be secured in said opening 100 by any suitable means such as by legs 103 and 104, all as best shown in Figure 2.

Vertically mounted in said cup-shaped fitting 102 at approximately the center thereof is a shaft 105, radially mounted at the upper end of said shaft 105 and approximately flush with the carrier deck or runway surface 101 are spokes 106. It is standard practice aboard aircraft carriers to provide either four of said spokes 106, as shown in Figure 7, or five of said spokes 106, as shown in Figure 8. Said spokes 106 are rigidly mounted to the cup-shaped fitting 102, as at 107, and span the distance between the vertical shaft 105 and the upper lip of the cuplike fitting 102.

The operation of the device is as follows:

If the aircraft 10, which is to have its full power run-up, is on a carrier which is equipped with four-spoked anchor means, such as shown in Figure 7, the chain 12 is attached to the aircraft by means of the catapult holdback fitting 11 on the aircraft, and the coupling 79, the nuts 83 and 84 being run up to tight locking position and to hold the coupling 79 in closed contact with catapult holdback fitting 11.

The attachment fitting is then placed in the position shown in Figure 2, i.e., with the body structure 50 and the four dogs 55 disposed downwardly. The collar 70 is then lifted against the pressure of the spring 73, and the attachment fitting is maneuvered into position until the space between the dogs 55 is over the spokes 106 of the four-spoked anchor means, with the collar 70 still in lifted position. The device is then lowered into position over said spokes 106 and then turned in a clockwise direction until the spokes 106 are disposed in the indentations 56. The collar 70 is then released, and as it is impelled downwardly by the spring 73, the dogs 71 are disposed in the space between the dogs 55, thus locking the spokes 106 in the indentations 56.

The free end of the chain 12 is then disposed in the slot 23 of the sleeve 22, and secured therein by the pin or bolt 20 and the nut 21.

When the run-up starts, the aircraft will tauten the chain 12 and the aircraft will be securely anchored to the deck.

If the aircraft carrier deck is equipped with the alternate five-spoked anchor means, such as shown in Figure 8, the same procedure is followed, except that the attachment fitting is reversed so that the body structure 40 and the five dogs 45 are positioned over the five-spoked anchor means, and the five spokes 106 are locked in the indentations 46.

When the full power run-up has been completed, and tension is removed from the chain 12, the coupling 79 is easily removed from the catapult holdback fitting 11, thus releasing the aircraft 10 from chain 12 and the attachment fitting.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus.

Having thus described our invention, what we claim as new and desire to secure by Letters Patent is:

1. An attachment fitting for a fixed anchor having spokes, comprising a stud, a pair of body structures rigidly mounted on said stud at opposite ends thereof, a series of engaging dogs mounted on said body structures and adapted to engage said spokes, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, and attachment means releasably mounted on said sleeve.

2. An attachment fitting for fixed anchors having varied numbers of spokes comprising a stud, a pair of body structures rigidly mounted on said stud at opposite ends thereof, a series of dogs rigidly mounted on one of said body structures and adapted to engage the spokes of one of said fixed anchors, a second series of dogs rigidly mounted on the other body structure and adapted to engage the spokes of the other of said fixed anchors, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, and attachment means releasably mounted on said sleeve.

3. An attachment fitting for a fixed anchor having spokes, comprising a stud, a pair of body structures rigidly mounted on said stud at opposite ends thereof, a series of engaging dogs mounted on said body structures and spaced apart from each other, an arcuate indentation in each of said engaging dogs, each said indentation being adapted to receive one of said spokes, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, and attachment means releasably mounted on said sleeve.

4. An attachment fitting for a fixed anchor having spokes, comprising a stud, a pair of body structures rigidly mounted on said stud at opposite ends thereof, an outwardly extending flange formed on the outside edge of each of said body structures, a series of engaging dogs mounted on said body structures and adapted to engage said spokes, rings slidably mounted on each of said body structures and normally seated on said body flanges, a series of locking dogs mounted on each of said rings and disposed intermediate of said engaging dogs for releasably locking said engaging dogs on said spokes, a sleeve rotatably mounted on said stud between said body structures, and attachment means releasably mounted on said sleeve.

5. An attachment fitting for a fixed anchor having spokes, comprising a stud, a pair of body structures rigidly mounted on said stud at opposite ends thereof, an outwardly extending flange formed on the outside edges of each of said body structures, a series of spaced apart engaging dogs mounted on said body structures and adapted to engage said spokes, a series of open-ended parallel grooves in said body structures and flanges intermediate said engaging dogs, rings slidably mounted on each of said body structures and normally seated on said body flanges, a series of locking dogs mounted on each of said rings, slidably disposed in said grooves and adapted for releasably locking said engaging dogs on said spokes, a sleeve rotatably mounted on said stud between said body structures, and attachment means releasably mounted on said sleeve.

6. An attachment fitting for a fixed anchor having spokes, comprising a stud, a pair of body structures rigidly mounted on said stud at opposite ends thereof, an outwardly extending flange formed on the outside edge of each of said body structures, a series of spaced apart engaging dogs mounted on said body structures and adapted to engage said spokes, a series of open-ended parallel grooves in said body structures and flanges intermediate said engaging dogs, rings slidably mounted on each of said body structures and normally seated on said body flanges, a series of locking dogs mounted on each of said rings, slidably disposed in said grooves and adapted for releasably locking said engaging dogs on said spokes, a sleeve rotatably mounted on said stud between said body structures, spiral springs loosely mounted on each of said body structures, seated on opposite sides of said sleeve, and biasing said rings outwardly from aid sleeve, and attachment means releasably mounted on said sleeve.

7. An attachment fitting for a fixed anchor having spokes, comprising a stud, a pair of body structures rigidly mounted on said stud at opposite ends thereof, an outwardly extending flange formed on the outside edge of each of said body structures, a series of spaced apart engaging dogs mounted on said body structures and adapted to engage said spokes, a series of open-ended parallel grooves in said body structures and flanges intermediate said engaging dogs, rings slidably mounted on each of said body structures and normally seated on said body flanges, a series of locking dogs mounted on each of said rings, slidably disposed in said grooves and adapted for releasably locking said engaging dogs on said spokes, a sleeve rotatably mounted on said stud between said body structures, spiral springs loosely mounted on each of said body structures, seated on opposite sides of said sleeve, and biasing said rings outwardly from said sleeve, whereby the locking dogs are normally disposed between the engaging dogs to lock the engaging dogs in engagement with said spokes, but when the ring on which the locking rings are mounted is depressed against the spring action, the locking dogs slide out of the spaces between the engaging dogs and the engaging dogs may be moved out of engagement with the spokes, and attachment means releasably mounted on said sleeve.

8. An attachment fitting for a fixed anchor having spokes, comprising a stud, a pair of body structures rigidly mounted on said stud at opposite ends thereof, a series of engaging dogs mounted on said body structures and adapted to engage said spokes, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, attachment means releasably mounted at one end thereof on said sleeve, and a coupling at the other end of said attachment means for releasably mounting said chain to the catapult holdback fitting of an aircraft.

9. An attachment fitting for a fixed anchor having spokes, comprising a stud, a pair of body structures, rigidly mounted on said stud at opposite ends thereof, a series of engaging dogs mounted on said body structures and adapted to engage said spokes, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, attachment means releasably mounted at one end thereof on said sleeve, and a coupling at the other end of said attachment means for releasably mounting said attachment means to the catapult holdback fitting of an aircraft, said coupling having a shaft adapted to be firmly but releasably disposed in the slotted opening in said catapult holdback fitting.

10. An attachment fitting for a fixed anchor having spokes, comprising a stud, a pair of body structures rigidly mounted on said stud at opposite ends thereof, a series of engaging dogs mounted on said body structures and adapted to engage said spokes, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, attachment means releasably mounted at one end thereof on said sleeve, and a coupling at the other end of said attachment means for releasably mounting said attachment means to the catapult holdback fitting of an aircraft, said coupling having a shaft adapted to be firmly but releasably disposed in the slotted opening in said catapult holdback fitting, and a clevis-type fitting adjustably mounted on the free end of said shaft, attached to said attachment means by its tines and a spanning bolt.

11. An attachment fitting for a fixed anchor having spokes, comprising a stud, a pair of body structures rigidly mounted on said stud at opposite ends thereof, a series of engaging dogs mounted on said body structures and adapted to engage said spokes, rings slidably mounted on each of said body structures, a series of locking dogs mounted on each of said rings and disposed intermediate of said engaging dogs for releasably locking said engaging dogs on said spokes, a sleeve rotatably mounted on said stud between said body structures, attachment means releasably mounted at one end thereof on said sleeve, and a coupling at the other end of said attachment means for releasably mounting said attachment means to the catapult holdback fitting of an aircraft, whereby an aircraft located at any point within a 360° radius of said fixed anchor may be securely but releasably anchored during full power run-up.

References Cited in the file of this patent
UNITED STATES PATENTS

| | | |
|---|---|---|
| 147,928 | Fry | Feb. 24, 1874 |
| 1,070,856 | Batsleer et al. | Aug. 19, 1913 |
| 1,818,261 | Koch et al. | Aug. 11, 1931 |
| 2,391,921 | Replogle | Jan. 1, 1946 |
| 2,519,460 | Hansen | Aug. 22, 1950 |
| 2,742,865 | Chandler et al. | Apr. 24, 1956 |